(12) United States Patent
Hiller

(10) Patent No.: US 7,835,166 B2
(45) Date of Patent: Nov. 16, 2010

(54) METHOD FOR CONTROLLING A POLYPHASE CONVERTER WITH DISTRIBUTED ENERGY STORES

(75) Inventor: Marc Hiller, Nürnberg (DE)

(73) Assignee: Siemens A.G., Munich (DE)

(*) Notice: Subject to any disclaimer, the term of this patent is extended or adjusted under 35 U.S.C. 154(b) by 282 days.

(21) Appl. No.: 12/067,555

(22) PCT Filed: Aug. 2, 2006

(86) PCT No.: PCT/EP2006/064961

§ 371 (c)(1),
(2), (4) Date: Mar. 20, 2008

(87) PCT Pub. No.: WO2007/033852

PCT Pub. Date: Mar. 29, 2007

(65) Prior Publication Data

US 2008/0310205 A1    Dec. 18, 2008

(30) Foreign Application Priority Data

Sep. 21, 2005  (DE) ..................... 10 2005 045 090

(51) Int. Cl.
*H02M 7/5387* (2007.01)

(52) U.S. Cl. ..................................... 363/132

(58) Field of Classification Search ............ 363/16, 363/17, 56.01–56.05, 97, 98, 131, 132
See application file for complete search history.

(56) References Cited

U.S. PATENT DOCUMENTS 7,110,272 B2 *  9/2006  Nojima ............... 363/56.03
7,577,008 B2 *  8/2009  Hiller ................. 363/132

FOREIGN PATENT DOCUMENTS

| DE | 101 03 031 A1 | 7/2002 |
| DE | 102 14 509 A1 | 10/2003 |
| DE | 102 17 889 A1 | 11/2003 |

* cited by examiner

*Primary Examiner*—Matthew V Nguyen
(74) *Attorney, Agent, or Firm*—Henry M. Feiereisen; Ursula B. Day (57) ABSTRACT

The invention relates to a method for controlling a power converter comprising at least two phase modules, each of which is provided with an upper and a lower valve leg that is equipped with at least two serially connected bipolar subsystems, respectively. According to the invention, the switching actions in the two valve legs (T1, T2; T3, T4; T5, T6) of each phase module (100) of the multiphase power converter having distributed energy stores are performed at a freely selected interval ($\Delta TZ$) rather than synchronously. The inventive control method for a multiphase power converter having distributed energy stores thus makes it possible to dynamically regulate valve leg currents (i11, i12, i21, i31, i32).

8 Claims, 8 Drawing Sheets

METHOD FOR CONTROLLING A POLYPHASE CONVERTER WITH DISTRIBUTED ENERGY STORES

BACKGROUND OF THE INVENTION

The invention relates to a method for controlling a converter having at least two phase modules, which each have an upper and a lower valve branch, which each have at least two series-connected two-pole subsystems, with a constant, freely variable number of subsystems of each phase module being operated such that their terminal voltages are in each case equal to a capacitor voltage across the energy storage capacitor in the associated subsystem, with the remaining subsystems of this phase module being operated such that their terminal voltages are equal to zero.

Figure 1:
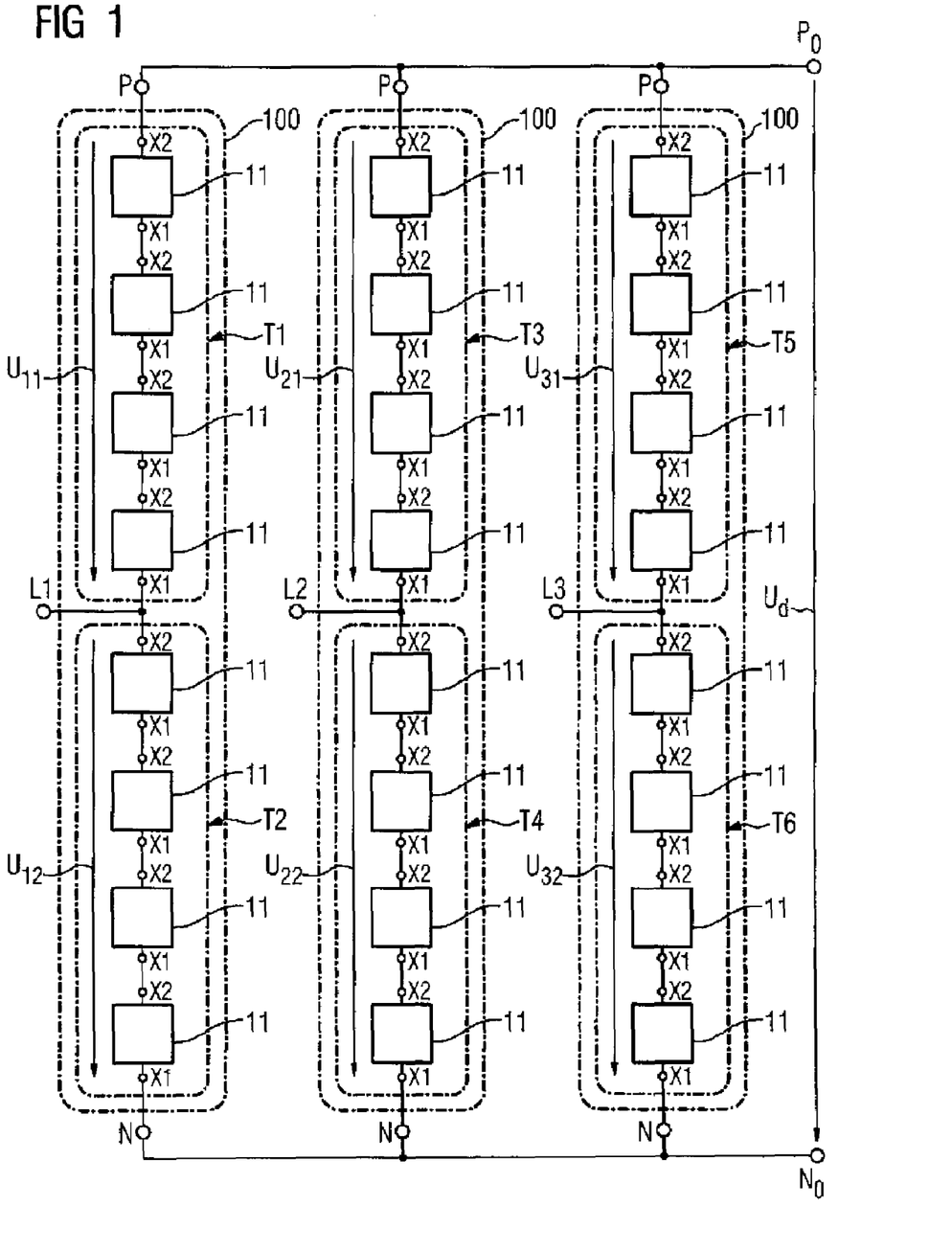
FIG. 1 shows a circuit arrangement of a known converter with distributed energy stores, FIGS. 2 to 4 each show a circuit arrangement of one embodiment of a known subsystem.
Figure 2:
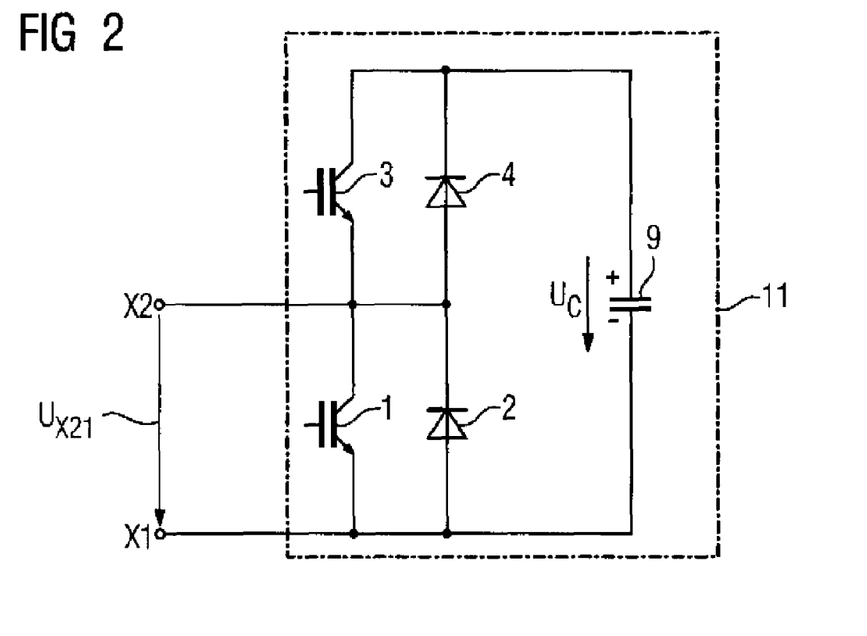

A polyphase converter is known from DE 101 03 031 A1. FIG. 1 illustrates a circuit arrangement of a converter such as this, in more detail. According to this circuit arrangement, this known converter circuit has three phase modules, which are each annotated 100. These phase modules 100 are each electrically conductively connected on the DC voltage side by a respective connection P or N to a positive and a negative DC voltage busbar $P_0$ and $N_0$. There is a DC voltage $U_d$ between these two DC voltage busbars $P_0$ and $N_0$. Each phase module 100 has an upper and a lower valve branch T1, T3 and T5, as well as T4 and T6, respectively. Each of these valve branches T1 to T6 has a number of two-pole subsystems 11 which are electrically connected in series. Four of these subsystems 11 are shown for each valve branch T1, . . . , T6 in this equivalent circuit. Two-pole subsystems 12 (FIG. 3) can also be electrically connected in series instead of the two-pole subsystems 11 (FIG. 2). Each junction point between two valve branches T1 and T2, T3 and T4 or T5 and T6 of a phase module 100 forms a respective connection L1, L2 or L3 of this phase module 100 on the AC voltage side. Since, in this description, the converter has three phase modules 100, a three-phase load, for example a three-phase motor, can also be connected to their connections L1, L2 and L3, which are also referred to as load connections, on the AC voltage side.

Figure 3:
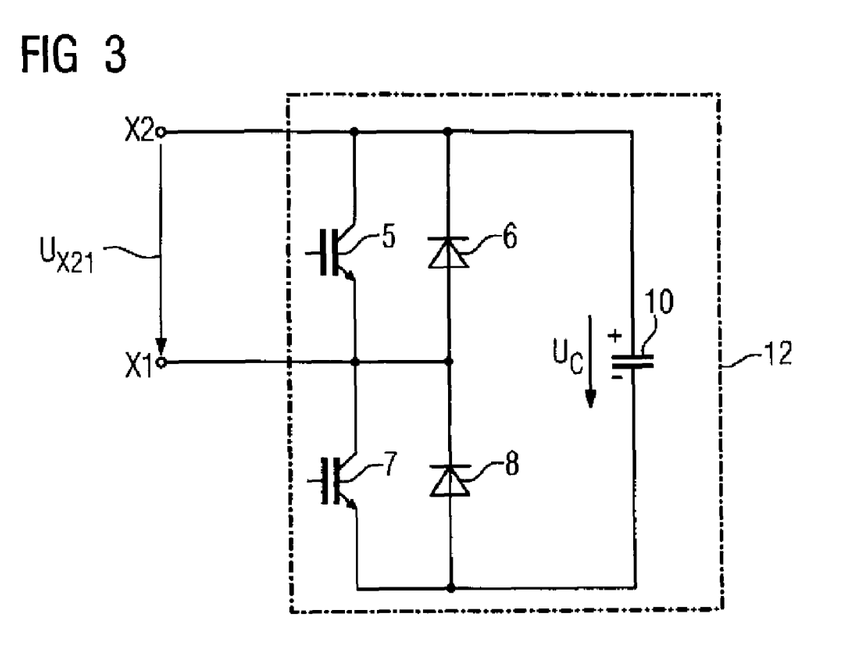

FIG. 2 shows one embodiment of a two-pole known subsystem 11 in more detail. The circuit arrangement shown in FIG. 3 represents a functionally completely equivalent variant, which is likewise known from DE 101 03 031 A1. These known two-pole subsystems 11 and 12 each have two semiconductor switches 1, 3 and 5, 7 which can be switched off, two diodes 2, 4 and 6, 8, and a unipolar energy storage capacitor 9 and 10. The two semiconductor switches 1 and 3, as well as 5 and 7, respectively, which can be switched off are electrically connected in series, with these series circuits being connected electrically in parallel with a respective energy storage capacitor 9 or 10. One of the two diodes 2, 4 and 6, 8 is electrically connected in parallel with each semiconductor switch 1 and 3, or 5 and 7, respectively, which can be switched off such that these diodes 2, 4 and 6, 8 are electrically connected back to back in parallel with the corresponding semiconductor switches 1, 3, 5 or 7 which can be switched off. The unipolar energy storage capacitor 9 or 10 in the respective subsystem 11 or 12 comprises either a capacitor or a capacitor bank composed of a plurality of such capacitors with a resultant capacity $C_0$. The connecting point of the emitter of the respective semiconductor switch 1 or 5 which can be switched off and the anode of the respective diode 2 or 6 forms a connecting terminal X1 of the respective subsystem 11 or 12. The connecting point of the two semiconductor switches 1 and 3 which can be switched off and of the two diodes 2 and 4 form a second connecting terminal X2 of the subsystem 11. The connecting point of the collector of the semiconductor switch 5 which can be switched off and the cathode of the diode 6 forms a second connecting terminal X2 of the subsystem 12.

In both illustrations of the embodiments of the two subsystems 11 and 12, as illustrated in FIGS. 2 and 3, insulated gate bipolar transistors (IGBTs) are used as semiconductor switches 1, 3 and 5, 7 which can be switched off. Furthermore, MOS field-effect transistors, also referred to as MOSFETs, can be used. Gate turn-off thyristors (GTO thyristors) or integrated gate commutated thyristors (IGCTs) can likewise be used as semiconductor switches 1, 3 and 5, 7 which can be turned off.

According to DE 101 03 031 A1, the respective subsystems 11 and 12 of each phase module 100 of the polyphase converter shown in FIG. 1 can be controlled in a switching state I, II or III, respectively. In the switching state I, the respective semiconductor switch 1 or 5 which can be turned off is switched on, and the respective semiconductor switch 3 or 7 which can be turned off in the subsystem 11 or 12 is switched off. This results in a terminal voltage $U_{X21}$, at the connecting terminals X1 and X2, in the respective subsystem 11 or 12 being equal to zero. In the switching state II, the respective semiconductor switch 1 or 5 which can be turned off is switched off, and the respective semiconductor switch 3 or 7 which can be turned off in the subsystem 11 or 12 is switched on. In this switching state II, the terminal voltage $U_{X21}$ that occurs is equal to the capacitor voltage $U_C$ across the respective energy storage capacitor 9 or 10. In the switching state III, both the respective semiconductor switches 1, 3 and 5, 7 which can be turned off are switched off, and the capacitor voltage $U_C$ across the respective energy storage capacitor 9 or 10 is constant.

Figure 4:
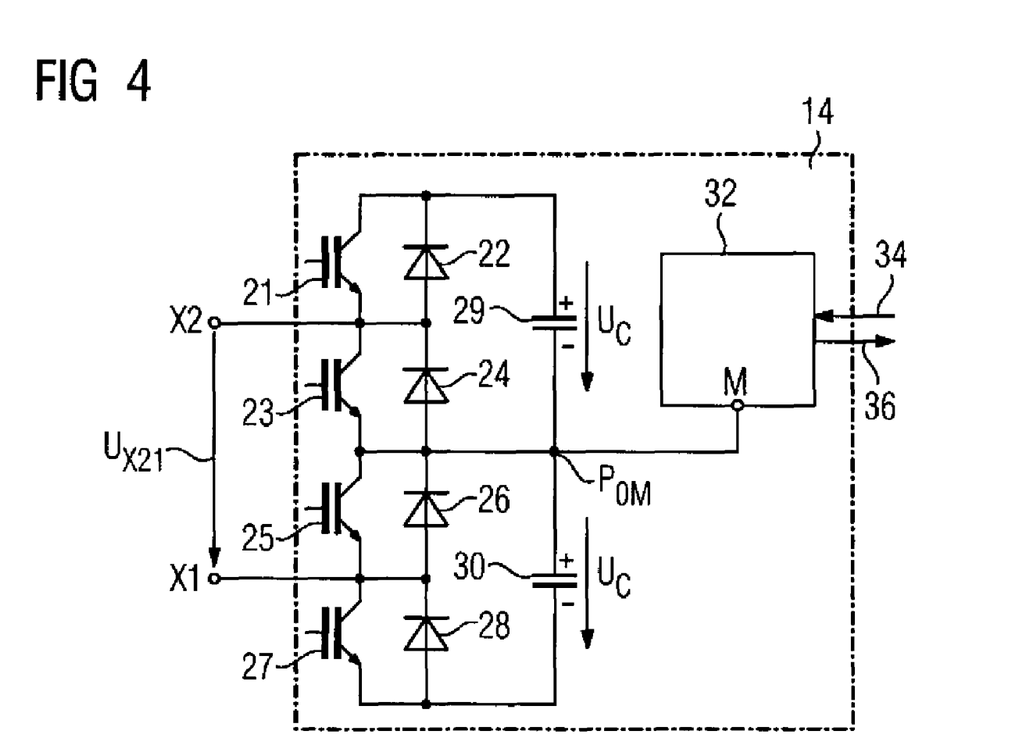

FIG. 4 shows a circuit arrangement of a further embodiment of a subsystem 14, in more detail. This two-pole subsystem 14 was registered in a prior national patent application with the official file reference 2005P12105 DE, and has four semiconductor switches 21, 23, 25 and 27 which can be turned off, four diodes 22, 24, 26 and 28, two unipolar capacitors 29 and 30 and electronics 32, also referred to in the following text as the electronic assembly 32. The four semiconductor switches 21, 23, 25 and 27 which can be turned off are connected electrically in series. Each of these semiconductor switches 21, 23, 25 and 27 has a diode 22, 24, 26 and 28 electrically connected back-to-back in parallel with it. One respective unipolar capacitor 29 or 30 is electrically connected in parallel with two respective semiconductor switches 21, 23 and 25, 27 which can be turned off. The respective unipolar capacitor 29 or 30 in this subsystem 14 comprises either a capacitor or a capacitor bank composed of a plurality of such capacitors with a resultant capacitance $C_0$. The connecting point of the two semiconductor switches 21 and 23 which can be turned off and of the two diodes 22 and 24 forms a second connecting terminal X2 of the subsystem 14. The connecting point of the two semiconductor switches 25 and 27 which can be turned off and of the two diodes 26 and 28 forms a first connecting terminal X1 of this subsystem 14. The connecting point of the emitter of the semiconductor switch 23 which can be turned off, of the collector of the semiconductor switch 25 which can be turned off, of the anode of the diode 24, of the cathode of the diode 26, of the negative connection of the unipolar capacitor 29 and of the positive connection of the unipolar capacitor 30 forms a common potential $\mathrm{I}\overset{<}{d}$ which is electrically conductively connected to a reference-ground potential connection M of the electronics assembly 32. This electronics assembly 32 is linked for signalling purposes by means of two optical waveguides 34 and 36 to a higher-level converter control system, which is not illustrated in any more detail. The common potential $\text{I}_d^<$ is used as a reference ground potential for the electronics assembly 32.

This subsystem 14 can be controlled in four switching states I, II, III and IV. In the switching state I, the semiconductor switches 21 and 25 which can be turned off are switched on, and the semiconductor switches 23 and 27 which can be turned off are switched off. In consequence, the terminal voltage $U_{X21}$ at the connecting terminals X2 and X1 in the subsystem 14 is equal to the capacitor voltage $U_C$ across the capacitor 29. In the switching state II, the semiconductor switches 21 and 27 which can be turned off are switched on while, in contrast, the semiconductor switches 23 and 25 which can be turned off are switched off. The terminal voltage $U_{X21}$ of the subsystem 14 now corresponds to the sum of the capacitor voltages $U_C$ across the unipolar capacitors 29 and 30. In the switching state III, the semiconductor switches 23 and 25 which can be turned off are switched on, and the semiconductor switches 21 and 27 which can be turned off are switched off. In this switching state, the terminal voltage $U_{XZ1}$ of the subsystem 14 is equal to 0. In the switching state IV, the semiconductor switches 23 and 27 which can be turned off are switched on while, in contrast, the semiconductor switches 21 and 25 which can be turned off are switched off. In consequence, the terminal voltage $U_{X21}$ of the subsystem 14 changes from the potential level "zero" to the potential level "capacitor voltage $U_C$" which is the voltage across the unipolar capacitor 30. In the switching states I and IV, the respective energy store 29 or 30 receives or emits energy depending on the terminal current direction. In the switching state III, the capacitors 29 and 30 receive or emit energy depending on the terminal current direction. In a switching state III ("zero"), the energy in the capacitors 29 and 30 remains constant. This subsystem 14 according to the invention therefore corresponds, in terms of its functionality, to the known subsystem 11 being connected in series with the known subsystem 12.

The maximum number of respective energy stores 9 and 10 which can in fact be connected in series between a positive terminal P and the connection Lx, where x=1, 2, 3, on the AC voltage side of each phase module 100 of the polyphase converter as shown in FIG. 1 is referred to as the series operating cycle n. The maximum number of respective energy stores 9 and 10 which are actually connected in series between a positive terminal p and the connection Lx, where x=1, 2, 3, on the AC voltage side is reached when all the subsystems 11, 12 and/or all the subsystems 14 of this valve branch T1, T3 or T5 have been switched to the switching state II ($U_{11}$=n·$U_C$ and $U_{21}$=n·$U_C$ and $U_{31}$=n·$U_C$, respectively). It is advantageous, but not absolutely essential, to provide the same series operating cycle n between the connection Lx on the AC voltage side and a negative terminal N of each phase module 100. The subsystems 11 and 12 shown in FIGS. 2 and 3 have a respective energy storage capacitor 9 or 10, while the subsystem 14 shown in FIG. 4 contains two energy storage capacitors 29 and 30. This therefore results in a series operating cycle of n=4 for the polyphase converter shown in FIG. 1, when four subsystems 11 and 12 are electrically connected in series in each case between the positive terminal P and the connection Lx on the AC voltage side of each phase module 100. However, if four subsystems 14 as shown in FIG. 4 are connected in series between the positive terminal P and the connection Lx on the AC voltage side of each phase module 100, then this results in a series operating cycle of n=8, since eight energy stores 29 and 30 can then be electrically connected in series. In applications in the field of power distribution, a polyphase converter such as this with distributed energy stores for each phase module 100 has at least 20 energy storage capacitors 9, 10 or 29, 30 connected electrically in series. Converters such as these are used for high-voltage direct-current transmission systems (HVDC system) or for flexible AC transmission systems, so-called FACTS.

The following explanatory notes are based on the assumption that all the energy stores in the subsystems 11, 12 or 14 of each valve branch T1, T2: T3, T4 or T5, T6, respectively, of each phase module 100 of the polyphase converter and shown in FIG. 1 each have the same capacitor voltage $U_C$. Methods for initial production of this state and for maintaining it during operation of a converter such as this are known from DE 101 03 031 A1.

Figure 5:
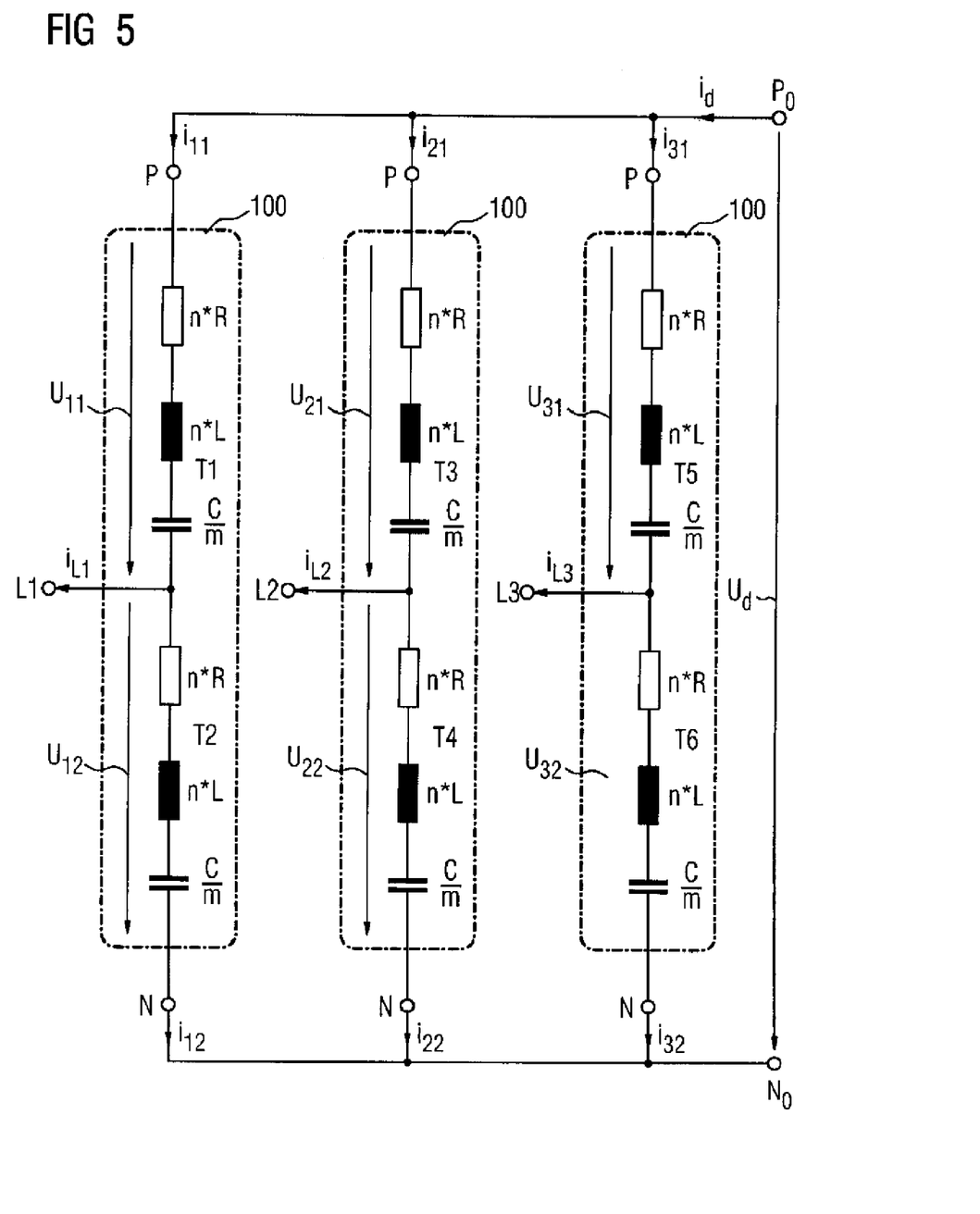

FIG. 5 shows an electrical equivalent circuit of the polyphase converter shown in FIG. 1. In this electrical equivalent circuit, the individual equivalent circuit components of each subsystem of a valve branch T1 . . . , T6 are combined to form an electrical equivalent circuit of one valve branch T1, . . . , T6.

In general, it is advantageous to design the polyphase converter such that, averaged over time, a suitable number of the systems 11, 12 and/or 14 are always being operated, such that the sum of their terminal voltages is given by: $\Sigma U_{X21}$=n·$U_C$ (switching state II). This corresponds to precisely half of the energy stored in the series-connected subsystems 11, 12 and/or 14, and leads to a mean intermediate-circuit voltage of $U_d$=n·$U_C$. This corresponds to a drive level b on the DC voltage side of 0.5, with the drive level b representing the ratio of the actual intermediate-circuit voltage $U_d$ to the maximum possible intermediate-circuit voltage $U_{dmax}$. This drive level is calculated using the following equation:

$$b = \frac{U_d}{U_{dmax}} = \frac{U_d}{2 \cdot n \cdot U_c} \tag{1}$$

Equivalent capacitance value of each valve branch T1, . . . , T6, averaged over time, is therefore C/m, where m=n/2. In order to prevent large uncontrolled equalizing currents flowing through the DC voltage busbars $P_0$ and $N_0$ between the individual phase modules 100 of the polyphase converter with distributed energy stores, the same nominal value is generally predetermined in each case between the terminals P and N of each phase module 100 for the respective voltages $U_{11}$, $U_{12}$, and $U_{21}$, $U_{22}$, and $U_{31}$, $U_{32}$ and this means that:

$$U_{11}+U_{12}=U_{21}+U_{22}=U_{31}+U_{32}=U_d. \tag{2}$$

If the respective semiconductor switches 1, 3; 5, 7 and 21, 23, 25, 27 of all the phase modules 100 of the polyphase converter with distributed energy stores are operated in a balanced form, then, for balancing reasons, the arithmetic mean values of the valve branch currents $i_{11}$, $i_{12}$, $i_{21}$, $i_{22}$, $i_{31}$ and $i_{32}$ become:

$$\bar{i}_{11}=\bar{i}_{12}\bar{i}_{21}\bar{i}_{22}=\bar{i}_{31}=\bar{i}_{32}=\tfrac{1}{3}\cdot I_d. \tag{3}$$

Because of the effective impedances of the phase modules 100 of the polyphase converter when the phases are being operated and loaded in a balanced form, these values are passive. The time profiles of the valve branch currents $i_{11}(t)$, $i_{12}(t)$, $i_{21}(t)$, $i_{22}(t)$, $i_{31}(t)$ and $i_{32}(t)$ therefore correspond to the following equations:

$$i_{11}(t) \sim \tfrac{1}{3} \cdot I_d + \tfrac{1}{2} \cdot i_{L1}(t),$$

$$i_{12}(t) \sim \tfrac{1}{3} \cdot I_d + \tfrac{1}{2} \cdot i_{L1}(t),$$

$$i_{21}(t) \sim \tfrac{1}{3} \cdot I_d + \tfrac{1}{2} \cdot i_{L2}(t),$$

$$i_{22}(t) \sim \tfrac{1}{3} \cdot I_d + \tfrac{1}{2} \cdot i_{L2}(t),$$

$$i_{31}(t) \sim \tfrac{1}{3} \cdot I_d + \tfrac{1}{2} \cdot i_{L3}(t),$$

$$i_{32}(t) \sim \tfrac{1}{3} \cdot I_d - \tfrac{1}{2} \cdot i_{L3}(t), \tag{4}$$

According to these equations, the valve branch currents $i_{11}(t)$, $i_{12}(t)$, $i_{21}(t)$, $i_{22}(t)$, $i_{31}(t)$ and $i_{32}(t)$ each have corresponding fundamental profiles comprising a DC component $\tfrac{1}{3} \cdot I_d$ and an AC component which corresponds to half the output current $i_{Lx}(t)$. This combination results from the balanced operation and the identical impedances, resulting from this, in all the valve branches T1, . . . , T6 (FIG. 5).

In order to ensure the passive setting of these valve branch currents $i_{11}(t)$, $i_{12}(t)$, $i_{21}(t)$, $i_{22}(t)$, $i_{31}(t)$ and $i_{32}(t)$ the following rules should be observed with regard to the operation of the semiconductor switches 1, 3; 5, 7 and 21, 23, 25, 27 which can be turned off in a respective subsystem 11, 12 or 14:

Within one phase module 100, care should always be taken to ensure that a constant number of energy stores in the subsystems 11, 12 and/or 14 are connected in series at any given time.

This means that, when a switching state change occurs from the switching state I to the switching state II in any given subsystem 11 or 12, or a change from the switching state I to II; IV to II; III to IV or III to I in any given subsystem 14, or from the switching state II to the switching state I in any given subsystem 11 or 12, or a change occurs from the switching state II to I; II to IV; IV to III or I to III in any given subsystem 14 in an upper or lower respective valve branch T1, T3, T5 or T2, T4, T6 of a phase module 100, a corresponding switching state change must also take place from the switching state II to the switching state I of any given subsystem 11 or 12 or a change from the switching state II to I; II to IV; IV to III or I to III of any given subsystem 14 or from the switching state I to the switching state II of any given subsystem 11 or 12 or a change from the switching state I to II; IV to II; III to IV or III to I of any given subsystem 14 in a lower or upper respective valve branch T2, T4, T6 or T1, T3, T5. With a drive level b of 0.5 on the DC voltage side, this means that the subsystems 11, 12 and/or 14 of a phase module 11 must always be switched such that n and only n energy stores in the subsystems 11, 12 and/or 14 are actually connected in series ($U_d = n \cdot U_C$).

If this condition is not satisfied, then this leads to undesirable and uncontrolled equalizing currents between the phase modules 100 of the polyphase converter with distributed energy stores as shown in FIG. 1. These equalizing currents are excited by a voltage/time integral $\Delta U_{ph}$, which can be calculated using the following equation:

$$\Delta U_{ph} = k \cdot U_C \cdot \Delta T \tag{5}$$

In this case, $\Delta T$ is a difference time interval which can occur when a switching state change occurs. This difference time interval $\Delta T$ is very much less than 1 µs. The factor k is a constant indicating the difference between the number of energy stores actually connected in series in the subsystems 11, 12 and/or 14 and the series operating cycle n. If the drive level b on the DC voltage side is 0.5, then: $-n \leq k \leq n$. The equalizing currents which are excited by this voltage/time integral $\Delta U_{ph}$ can be calculated using the electrical equivalent circuit shown in FIG. 5. In order to prevent high voltage/time integrals $\Delta U_{ph}$ resulting in the excitation of high equalizing currents, the drive for the polyphase converter with distributed energy stores should be designed such that only one or only a small number of subsystems 11, 12 and/or 14 of one valve branch T1, . . . , T6 can have their switching states changed at any one time.

This measure limits the constant k to low values.

Figure 6:
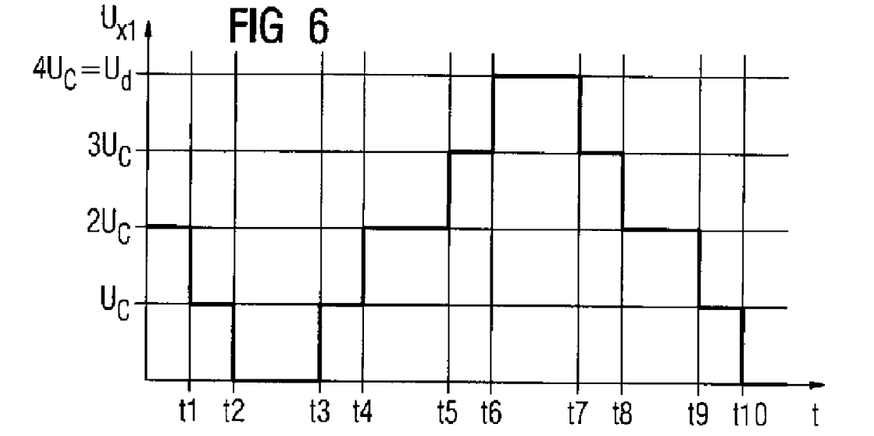
Figure 7:
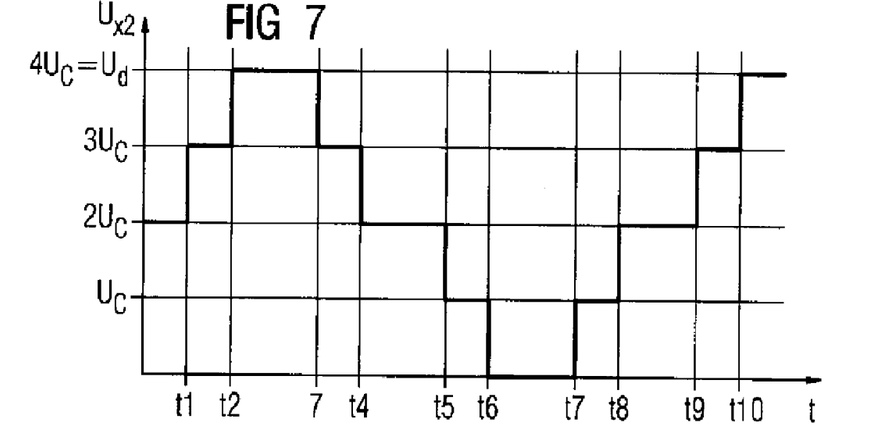
Figure 8:
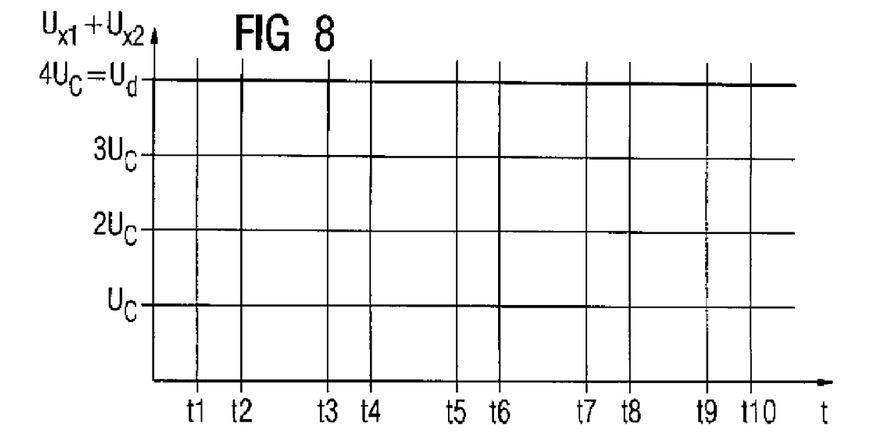

Basic profiles of the valve branch voltages $U_{x1}$ and $U_{x2}$, where x=1, 2, of an upper respective valve branch T1, T3 or T5 and a lower respective valve branch T2, T4 or T6 of a phase module 100 of a polyphase converter with distributed energy stores are each illustrated, by way of example, in a graph plotted against time t in FIGS. 6 and 7. The graph in FIG. 8 shows the profile of the sum of the two valve branch voltages $U_{x1}$ and $U_{x2}$ plotted against time t. In accordance with the control method described above, the sum of the two valve branch voltages $U_{x1}$ and $U_{x2}$ is always constant and corresponds to the intermediate-circuit voltage $U_d$. The switching operations illustrated in FIGS. 6 and 7 are required in order to allow the illustrated profile of the valve branch voltages $U_{x1}$ and $U_{x2}$ to be set. These valve branch voltages $U_{x1}$ and $U_{x2}$ of a phase module 100 are controlled by a higher-level control system.

According to the known control method, when the number of energy stores which are actually connected in series in the upper respective valve branch T1, T3 or T5 is changed, a corresponding number of subsystems 11, 12 and/or 14 in the lower respective valve branch T2, T4 or T6 have their switching state changed such that, in each phase module 100, a constant number n of energy stores are still connected in series in the subsystems 11, 12 and/or 14 for a drive level b of 0.5 on the DC voltage side. This results in a constant DC voltage of $U_d = n \cdot U_C$.

If this known method is used in all the parallel-connected phase modules 100 of the polyphase converter with distributed energy stores, this generally leads to there being no significant equalization processes in the form of equalizing currents between these phase modules 100. However, this is also dependent on the impedance relationships illustrated in FIG. 5.

SUMMARY OF THE INVENTION

The invention is now based on the idea of being able to influence the valve branch currents $i_{11}$, $i_{12}$, $i_{21}$, $i_{22}$, $i_{31}$ and $i_{32}$ differently from their passively set profile.

In principle, additional valve branch currents $i_{Zxy}(t)$ can be set and controlled as required in each valve branch T1, T2; T3, T4 or T5, T6, respectively, in a time profile for a valve branch current $i_{11}(t)$, $i_{12}(t)$, $i_{21}(t)$, $i_{22}(t)$, $i_{31}(t)$ and $i_{32}(t)$. These additional valve branch currents $i_{Zxy}(t)$ result in the time profiles of the valve branch currents, according to equation system (4), becoming:

$$i_{11}(t) = \tfrac{1}{3} \cdot I_d + \tfrac{1}{2} \cdot i_{L1}(t) + i_{Z11}(t),$$

$$i_{12}(t) = \tfrac{1}{3} \cdot I_d + \tfrac{1}{2} \cdot i_{L1}(t) + i_{Z12}(t),$$

$$i_{21}(t) = \tfrac{1}{3} \cdot I_d + \tfrac{1}{2} \cdot i_{L2}(t) + i_{Z21}(t),$$

$$i_{22}(t) = \tfrac{1}{3} \cdot I_d + \tfrac{1}{2} \cdot i_{L2}(t) + i_{Z22}(t),$$

$$i_{31}(t) = \tfrac{1}{3} \cdot I_d + \tfrac{1}{2} \cdot i_{L3}(t) + i_{Z31}(t),$$

$$i_{32}(t) = \tfrac{1}{3} \cdot I_d + \tfrac{1}{2} \cdot i_{L3}(t) + i_{Z32}(t) \tag{6}$$

In order to ensure that the output currents $i_{Lx}(t)$ do not change, the additional valve branch currents $i_{Zxy}(t)$ are set such that the additional valve branch currents $i_{Zxy}(t)$ of each phase module 100 are the same. This means that:

$$i_{Z11}(t) = i_{Z12}(t),$$

$$i_{Z12}(t) = i_{Z22}(t), \quad (7)$$

$$i_{Z31}(t) = i_{Z32}(t),$$

The invention is now based on the object of developing the known control method for a polyphase converter with distributed energy stores such that predetermined additional valve branch currents occur.

According to one aspect of the invention, this object is achieved by a method for controlling a polyphase converter having at least two phase modules, which have an upper and a lower valve branch, which each have at least two series-connected two-pole subsystems, with switching operations in the upper valve branch and corresponding switching operations in the lower valve branch of each phase module being carried out with a freely variable time interval between them.

According to another aspect of the invention this object is achieved by a method for controlling a polyphase converter having at least two phase modules, which each have an upper and a lower valve branch, which each have at least two series-connected two-pole subsystems, with at least two further switching operations, which are offset with respect to one another for a predetermined time interval, being carried out between time-synchronized switching operations in the upper and lower valve branch of each phase module (100), in an upper and/or a lower valve branch of each phase module.

Since additional voltage/time integrals are used in the valve branch voltages of a phase module as a manipulated variable to influence the valve branch currents, the valve branch currents can be influenced deliberately.

Voltage/time integrals such as these are produced, according to the invention, by the switching operations in the two valve branches of each phase module of the polyphase converter with distributed energy stores no longer being carried out synchronized in time, but with a freely variable time interval.

Voltage/time integrals such as these are also produced according to the invention by providing a further switching operation between the switching operations which are synchronized in time.

These further switching operations can be carried out in an upper and/or a lower valve branch of each phase module of the polyphase converter with distributed energy stores. This results in a balanced drive at the times of the additional switching operations in the upper and/or lower valve branches of each phase module of the polyphase converter with distributed energy stores.

In one advantageous method, the switching operations of an upper valve branch of a phase module are carried out delayed and/or advanced with respect to switching operations of a lower valve branch of this phase module. This allows a predetermined additional voltage/time integral to be set dynamically over one period of the valve branch voltages of a phase module.

In a further advantageous method, the two methods are combined with one another in order to generate additional voltage/time integrals. This means that a required predetermined voltage/time integral can be generated at any desired time.

A valve branch current can in each case be calculated as a function of the additional voltage/time integrals in conjunction with the electrical equivalent circuit of the valve branches of the polyphase converter with distributed energy stores. If the valve branch currents of the individual phase modules of the polyphase converter with distributed energy stores are measured, then an additional voltage/time integral can be determined at any time, ensuring that the existing valve branch currents are changed such that equalizing currents can no longer flow between the phase modules of the polyphase converter with distributed energy stores.

The use of the control method according to the invention results in dynamic control of the valve branch currents of a polyphase converter with distributed energy stores. Inter alia, this use results in a number of advantages:

damping of current oscillations, for example caused by:
    transient load change processes
    faults, for example unbalances in a power supply system or a machine, ground faults, lightning strikes, switching overvoltages, . . .
    inadequate damping of capacitive networks by the inductances and resistances provided in the design.
Faults coped with better.
Poor operating points coped with such as:
    operating points at low output frequencies.
Capabilities to optimize the design of the subsystems and of the polyphase converter in terms of capacitor complexity and the need for power semiconductors.
A uniform load ensured on all semiconductor switches which can be turned off.
Balancing of highly unbalanced voltage on the individual converter elements after fault disconnection.

BRIEF DESCRIPTION OF THE DRAWING

The rest of the explanation of the invention refers to the drawing, which schematically illustrates a plurality of embodiments of one method according to the invention for controlling a polyphase converter with distributed energy stores, and in which:

FIG. 5 shows an electrical equivalent circuit of the valve branches of the converter shown in FIG. 1, FIGS. 6 and 7 each use a graph plotted against time t to show a valve branch voltage of an upper and lower valve branch of a phase module of the known converter shown in FIG. 1, FIG. 8 uses a graph plotted against time t to show the sum voltage of the two valve branch voltages shown in FIGS. 6 and 7, FIGS. 9 and 10 each use a graph plotted against time t to show the valve branch voltages of a phase module of the converter shown in FIG. 1, when using a first embodiment of the control method according to the invention, FIG. 11 uses a graph plotted against time t to show the sum voltage of the two valve branch voltages shown in FIGS. 9 and 10, FIGS. 12 and 13 each use a graph plotted against time t to show valve branch voltages of a phase module of the converter shown in FIG. 1 when using a second embodiment of the control method according to the invention, FIG. 14 uses a graph plotted against time t to show the associated sum voltage, FIGS. 15 and 16 each use a graph plotted against time t to show a valve branch voltage of a phase module of the converter shown in FIG. 1, with these being the valve branch voltages which occur when using a combination of the two embodiments of the control method according to the invention.

DETAILED DESCRIPTION OF PREFERRED EMBODIMENTS

Figure 9:
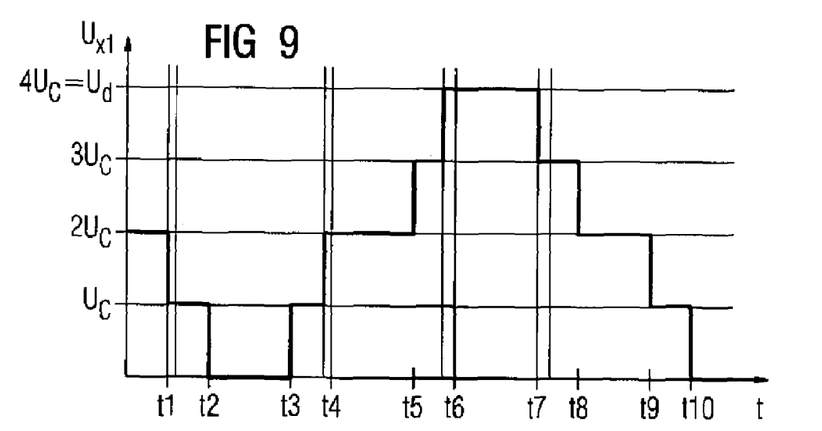
Figure 10:
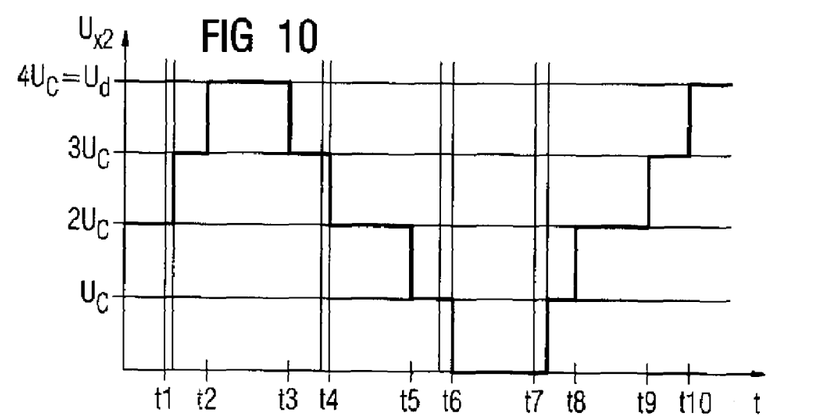
Figure 11:
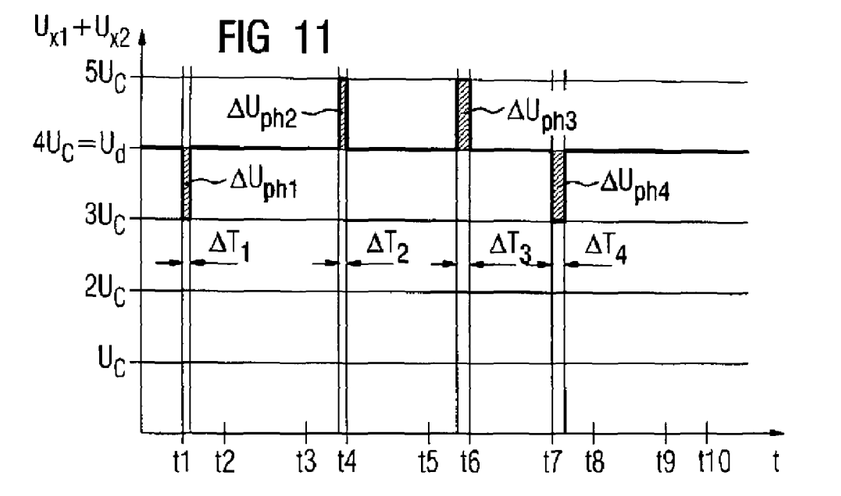

The graph in FIG. 9 shows the profile of a valve branch voltage $U_{x1}$ of an upper valve branch T1, T3 and T5 of a phase module 100 of the converter shown in FIG. 1, plotted against time t. The time profile of a valve branch voltage $U_{x2}$ of a lower valve branch T2, T4 or T6 of this phase module 100 is illustrated in more detail in the graph in FIG. 10. The sum voltage of these two valve branch voltages $U_{x1}$ and $U_{x2}$ of a phase module 100 of the converter shown in FIG. 1 is illustrated, plotted against time t, in the graph in FIG. 11. If this sum voltage is compared with the sum voltage in FIG. 8, it is evident that the sum voltage shown in FIG. 11 has additional voltage/time integrals $\Delta U_{ph1}, \ldots, \Delta U_{ph4}$. These additional voltage/time integrals $\Delta U_{ph1}, \ldots, \Delta U_{ph4}$ occur because the switching operations in the upper and lower respective valve branches T1 and T2; T3 and T4 as well as T5 and T6 of a phase module 100 are no longer carried out synchronized in time. Any given subsystem 11, 12 changes from the switching state I to the switching state II at the time t1, or any given subsystem 14 in the lower respective valve branch T2, T4 or T6 of the phase module 100 changes from the switching state I to II or IV to II, or III to IV, or III to I at the time t1 in comparison to the change of the switching state II to the switching state I of any given subsystem 11, 12 or the change from the switching state II to I, II to IV, IV to III, or I to III of any given subsystem 14 in the upper respective valve branch T1, T3 or T5 of this phase module 100, delayed by a time interval $\Delta T_1$. The additional voltage/time integral $\Delta U_{ph1}$ resulting from this is calculated using the following equation:

$$\Delta U_{ph} = k \cdot U_C \cdot \Delta T_Z \quad (8)$$

In this case, the factor k indicates the difference between the energy stores (in the switching state II in subsystems 11, 12 and in the switching state I or II or IV in the subsystem 14) which are actually connected in series and through which current passes during the time interval $\Delta T_Z$, and the series operating cycle n. In this example, the series operating cycle is n=4. This results in a factor of k=−1 for the time interval $\Delta T_1$. At the time t4, any given subsystem 11, 12 changes from the switching state I to the switching state II, or any given subsystem 14 in the upper valve branch T1, T3 or T5 changes from the switching state I to II, IV to II, III to IV, or III to I, with an advance corresponding to the time interval $\Delta T_2$ with respect to any given subsystem 11, 12 changing from the switching state II to the switching state I or any given subsystem 14 in the lower valve branch T2, T4, or T6 changing from the switching state II to I, II to IV, IV to III or I to III. The factor is therefore k=+1 during the time interval $\Delta T_2$. The magnitude of the additional voltage/time integrals $\Delta U_{ph1}, \ldots, \Delta U_{ph4}$ can be determined using the freely variable time interval $\Delta T_Z$. The mathematical sign of the additional voltage/time integral $\Delta U_{ph}$ and therefore the mathematical sign of an additional valve branch current $i_{Zxy}(t)$ are determined by means of the factor k. The additional valve branch current $i_{Zxy}(t)$ can be varied by generating a plurality of additional voltage/time integrals $\Delta U_{ph}$ distributed over the period of the fundamental frequency of the valve branch voltage $U_{x1}$ or $U_{x2}$, respectively, of a respective upper or lower valve branch T1, T3, T5 or T2, T4, T6. The valve branch currents $i_{xy}(t)$ can be dynamically controlled by means of this method according to the invention for controlling a polyphase converter with distributed energy stores as shown in FIG. 1.

Figure 12:
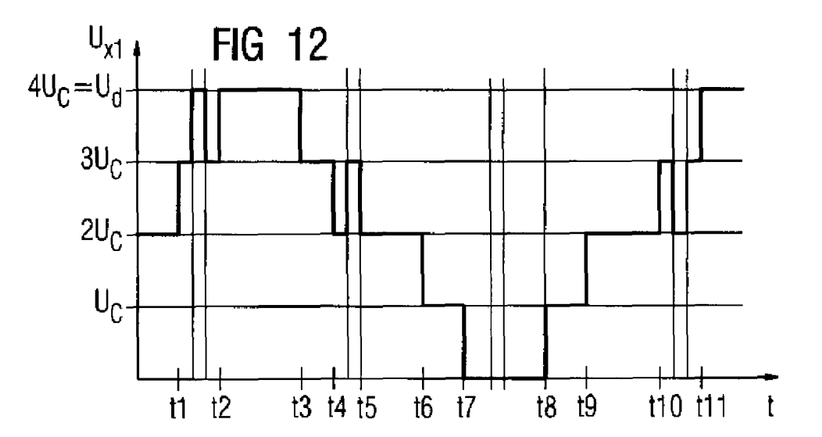
Figure 13:
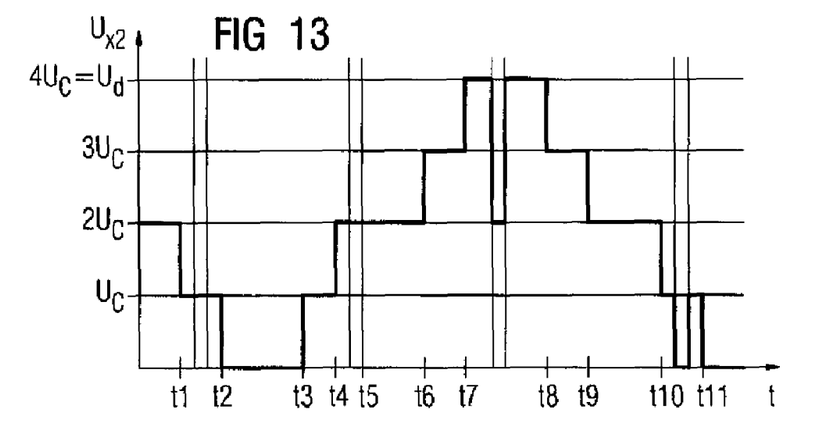
Figure 14:
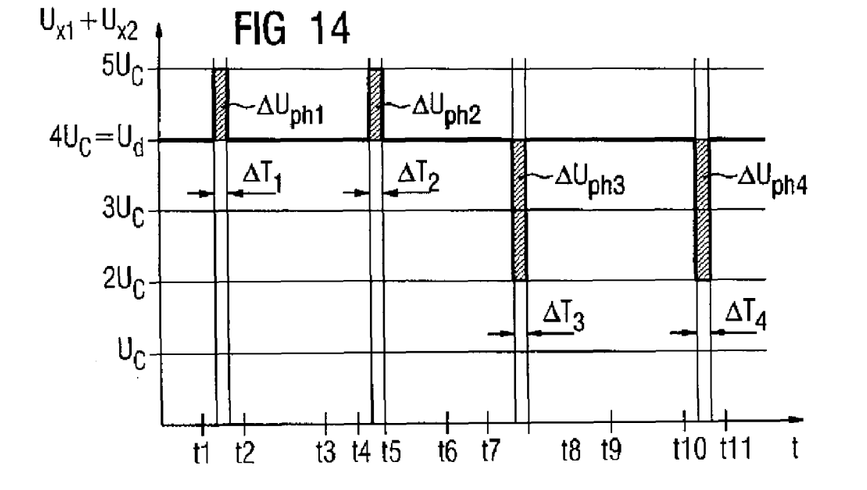

The graph in FIG. 12 shows the profile of a valve branch voltage $U_{x1}$ of an upper valve branch T1, T3 or T5 of a phase module 100 of a converter shown in FIG. 1. The profile of a valve branch voltage $U_{x2}$ of a corresponding respective valve branch T2, T4 or T6 of this phase module 100 is plotted against time t in the graph in FIG. 13. The associated sum voltage of these two valve branch voltages $U_{x1}$ and $U_{x2}$ is illustrated plotted against time t in the graph in FIG. 14. These two valve branch voltages $U_{x1}$ and $U_{x2}$ differ from the two valve branch voltages $U_{x1}$ and $U_{x2}$ shown in FIGS. 6 and 7 by additional switching operations being carried out in addition to the switching operations that are synchronized in time. Two switching operations have been inserted in the profile of the valve branch voltage $U_{x1}$ in the time period t2-t1, resulting in connection of a further respective subsystem 11 or 12 or a further energy store of a subsystem 14 of the respective upper valve branch T1, T3 or T5 of a phase module 100 for a time interval $\Delta T_1$. Further switching operations such as these are carried out in the time period t5-t4 for a time interval $\Delta T_2$. Two switching operations have been inserted in the profile of the valve branch voltage $U_{x2}$ in the time period t8-t7. These switching operations result in two respective subsystems 11 and 12 or two respective energy stores in the subsystems 14 being turned off for a time interval $\Delta T_3$ in the lower valve branch T2, T4 or T6, respectively, of a phase module 100. In the time period t11-t10, respective further switching operations are carried out in the upper and lower valve branch T1, T3, T5 and T2, T4, T6. As a result of these switching operations, a respective subsystem 11 or 12 or an energy store in a subsystem 14 of a phase module 100 is turned off for this time interval $\Delta T_4$ in the upper respective valve branch T1, T3 or T5 and a respective subsystem 11 or 12 or an energy store in a subsystem 14 is likewise turned off for the same time interval $\Delta T_4$ in the lower respective valve branch T2, T4 or T6. These further switching operations in the upper and/or lower valve branches T1, T3, T5 and/or T2, T4, T6 result in additional voltage/time integrals $\Delta U_{ph1}, \ldots, \Delta U_{ph4}$ being generated, which each generate additional valve branch currents $i_{Zxy}(t)$ in the respective valve branches T1, T2; T3, T4 or T5, T6 of each phase module 100 of the converter shown in FIG. 1. These additional voltage/time integrals $\Delta U_{ph1}, \ldots, \Delta U_{ph4}$ can be obtained from the sum voltage of the two valve branch voltages $U_{x1}$ and $U_{x2}$. The magnitude of these additional voltage/time integrals $\Delta U_{ph1}, \ldots, \Delta U_{ph4}$ depends on which additional valve branch currents $i_{Zxy}(t)$ are required in the respective valve branches T1, T2; T3, T4 or T5, T6 of each phase module 100. These additional voltage/time integrals $\Delta U_{ph1}, \ldots, \Delta U_{ph4}$ are calculated using the equation (7). The additional voltage/time integrals $\Delta U_{ph1}, \ldots, \Delta U_{ph4}$ obtained from this can also be distributed over time over one period of the fundamental frequency of the valve branch voltage $U_{x1}$ or $U_{x2}$, respectively, in the method for additionally introduced switching operations.

Figure 15:
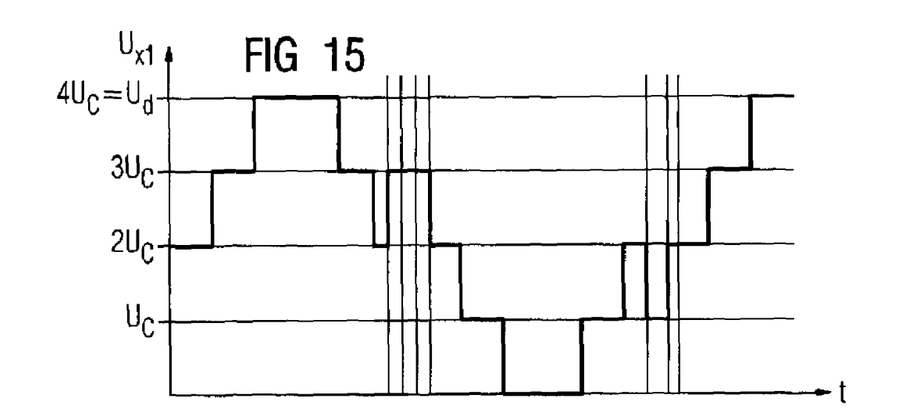
Figure 16:
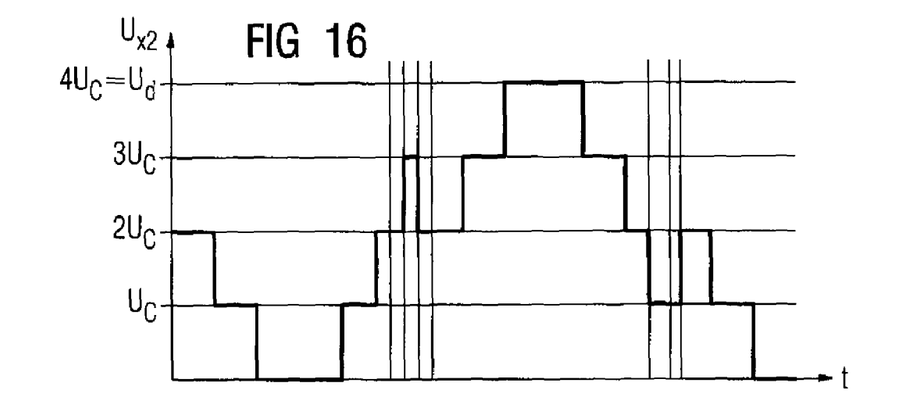
Figure 17:
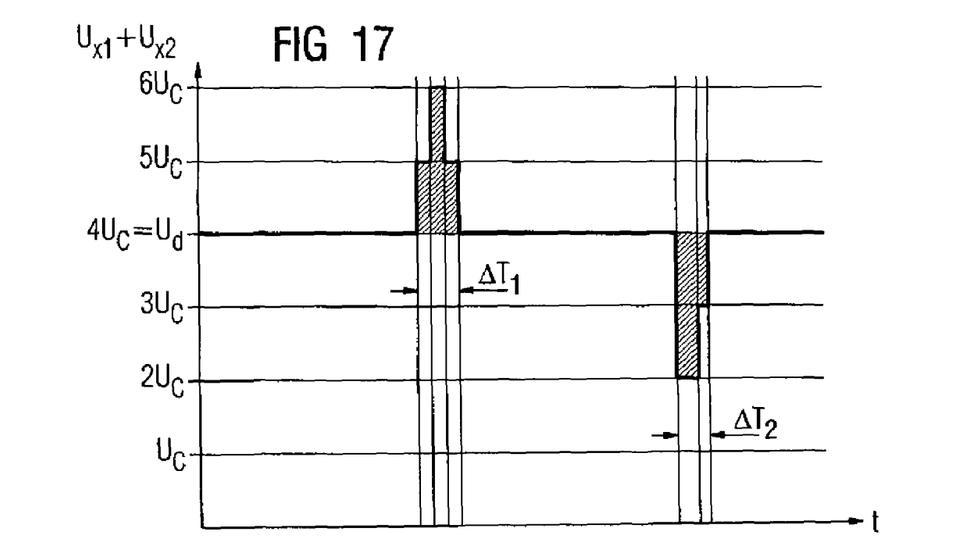
FIG. 17 shows a graph plotted against time t of the associated sum voltage.

A combination of the methods for producing additional voltage/time integrals $\Delta U_{ph1}, \ldots, \Delta U_{ph4}$ by delayed and/or advanced switching operations with additional switching operations leads to the profiles of the valve branch voltages $U_{x1}$ and $U_{x2}$ of an upper and lower respective valve branch T1, T2; T3, T4 or T5, T6 of a phase module 100 of the converter shown in FIG. 1. These valve branch voltages $U_{x1}$ and $U_{x2}$ are respectively shown in a graph plotted against time t in FIGS. 15 and 16. An associated sum voltage of these valve branch voltages $U_{x1}$ and $U_{x2}$ plotted against time is illustrated in the graph in FIG. 17.

What is claimed is:

1. A method for controlling a multiphase converter having at least two phase modules, wherein each phase module has two series-connected valve branches, with each valve branch having at least two series-connected switchable two-pole subsystems, the method comprising the steps of:

switching the at least two series-connected switchable two-pole subsystems of one of the two series-connected valve branches of a first of the at least two phase modules at a first switching time, and switching the at least two series-connected switchable two-pole subsystems of the other of the two series-connected valve branches of the first phase module at a second switching time, wherein the first switching time has a time offset with respect to the second switching time, and repeating switching at the first and second switching time for another of the at least two phase modules.

2. The method of claim 1, wherein the time offset represents a delay of the first switching time with respect to the second switching time of each phase module.

3. The method of claim 1, wherein the time offset represents a delay of the second switching time with respect to the first switching time of each phase module.

4. The method of claim 1, further comprising the step of maintaining the time offset for a predetermined time interval, said time offset producing a predetermined additional voltage/time integral.

5. A method for controlling a multiphase converter having at least two phase modules, wherein each phase module has two series-connected valve branches, with each valve branch having at least two series-connected switchable two-pole subsystems, said method comprising the steps of:

synchronously switching the at least two series-connected switchable two-pole subsystems of each of the two series-connected valve branches of each phase module at a first switching time;

additionally switching the at least two series-connected switchable two-pole subsystems of a first of the two series-connected valve branches of each phase module at a second switching time; and additionally switching the at least two series-connected switchable two-pole subsystems of a second of the two series-connected valve branches of each phase module at a third switching time, wherein the second switching time has a time offset with respect to the third switching time, and the second and third switching times are intermediate between successive first switching times.

6. The method of claim 5, wherein the first, second and third switching times are selected to produce a predetermined additional voltage/time integral.

7. The method as claimed in claim 4, wherein the additional voltage/time integral is calculated using the following equation:

$$\Delta U_{ph} = k \cdot U_C \cdot \Delta T_Z$$

wherein $U_C$ is a capacitor voltage of a two-pole subsystem, k (which may be negative or positive) indicates a difference between energy stored in the at least two series-connected two-pole subsystems of a valve branch, and $\Delta T_Z$ is the time offset between the first and second switching time for a given operating cycle.

8. The method as claimed in claim 6, wherein the additional voltage/time integral is calculated using the following equation:

$$\Delta U_{ph} = k \cdot U_C \cdot \Delta T_Z$$

wherein $U_c$ is a capacitor voltage of a two-pole subsystem, k (which may be negative or positive) indicates a difference between energy stores connected in series and a series operating cycle, and $\Delta T_Z$ is the time offset between the first and second switching time for a given operating cycle.

* * * * *